United States Patent [19]

Black

[11] 3,977,496

[45] Aug. 31, 1976

[54] AIR TOOL LUBRICATOR

[76] Inventor: Robert G. Black, 6601 N. Main St., Dayton, Ohio 45415

[22] Filed: May 30, 1974

[21] Appl. No.: 474,595

Related U.S. Application Data

[63] Continuation-in-part of Ser. No. 311,337, Dec. 1, 1972, abandoned.

[52] U.S. Cl. ............... 184/55 A; 51/262 R; 137/246.23; 184/7 F; 184/6.14; 184/76
[51] Int. Cl.² .................................... F16N 7/30
[58] Field of Search ............ 51/170 TL, 213, 262 R, 51/262 A, 34 D, 34 J; 184/83, 55 A, 55 R, 6.26, 64, 102, 1 R, 76, 80, 87, 82, 65, 66, 69, 6.14, 7 F; 137/246, 247.23, 246.23, 246.13, 246.12, 246.14, 519.5, 624.27

[56] References Cited
UNITED STATES PATENTS

| | | | |
|---|---|---|---|
| 110,868 | 1/1871 | Richter | 184/76 |
| 776,188 | 11/1904 | La Quay | 184/76 |
| 815,088 | 3/1906 | Gleason | 184/76 |
| 832,388 | 10/1906 | Kellogg et al. | 184/76 |
| 2,003,132 | 5/1935 | Bliss | 184/55 A |
| 2,308,773 | 1/1943 | Norgren et al. | 184/55 A |
| 2,984,316 | 5/1961 | Malec | 184/55 A |
| 3,033,223 | 5/1962 | Volpin | 184/39 X |
| 3,399,494 | 9/1968 | Hendrickson | 51/170 TL X |
| R24,232 | 10/1956 | Johnson | 184/55 A |

FOREIGN PATENTS OR APPLICATIONS

| | | | |
|---|---|---|---|
| 58,748 | 4/1913 | Austria | 184/55 R |
| 133,358 | 10/1919 | United Kingdom | 184/69 |

*Primary Examiner*—Richard C. Pinkham
*Assistant Examiner*—Arnold W. Kramer

[57] ABSTRACT

A lubricating device in a pneumatic tool or the like, which device is tool mounted beyond an on-off or throttle valve and utilizes air pressure from within the tool to achieve a metering flow of stored lubricant. The device is installed for convenient servicing and includes a lubricant storage tank, a lubricant outlet, a wick means and an intermediate "ready" chamber. The latter receives lubricant from the storage tank and is pressurized in an open position of the throttle valve to induce a movement of lubricant through the wick means for exposure to flowing pressure fluid. Valving means are operative to control access of air from the ready chamber to the storage tank.

3 Claims, 5 Drawing Figures

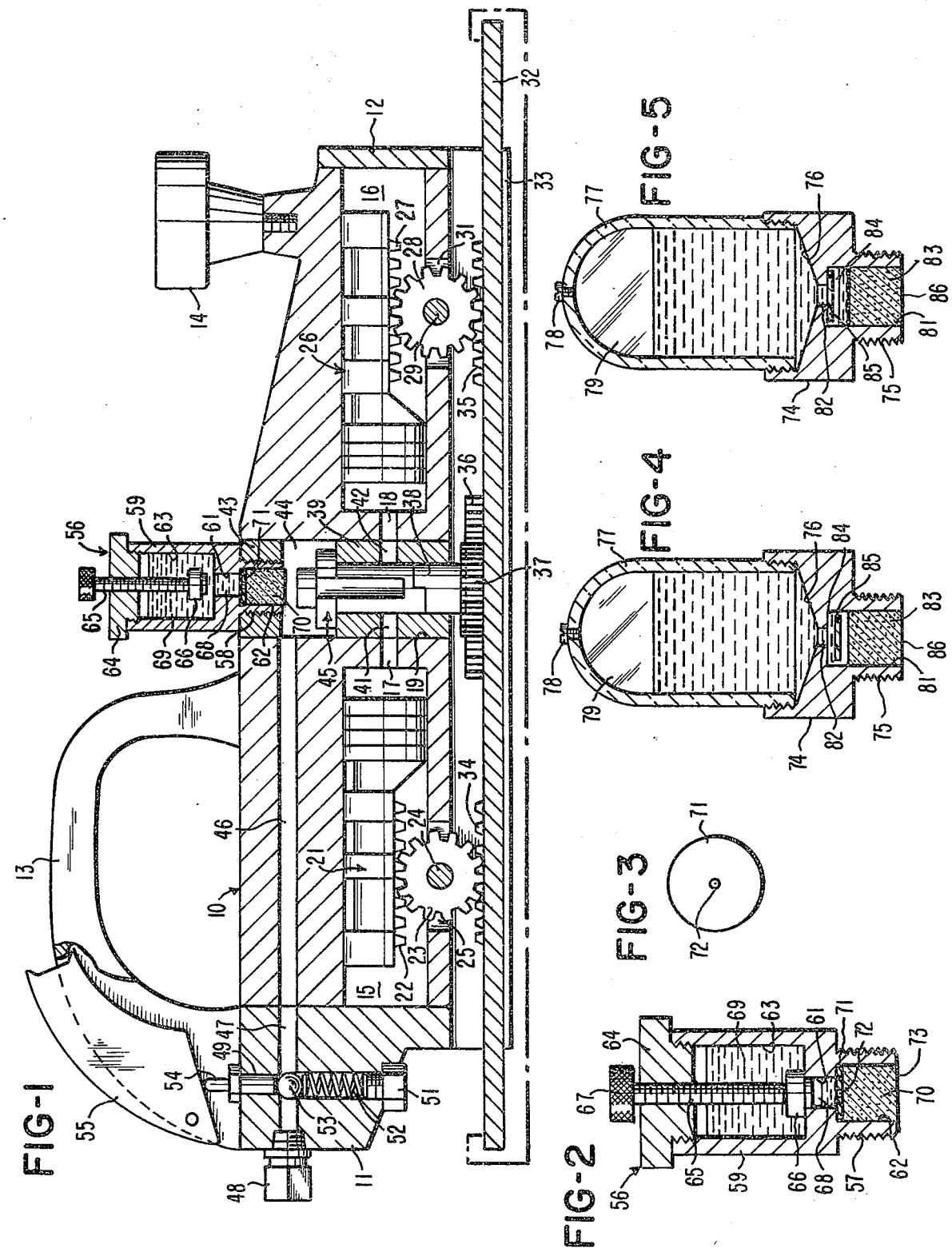

3,977,496

AIR TOOL LUBRICATOR

BACKGROUND OF THE INVENTION

This is a continuation in part of application Ser. No. 311,337, filed Dec. 1, 1972, and now abandoned, for AIR TOOL LUBRICATOR.

Compressed air operated tools include movable parts which desirably are lubricated incident to their continuing operation. It has been known to apply drops of lubricant directly to the moving parts but this has only a transient effect since most of the oil so applied soon blows out of the tool along with exhausting pressure fluid. It has been suggested that a convenient and effective way to accomplish such lubrication may be to introduce small amounts of an oil or other appropriate lubricant into air supply lines to be carried by the flowing air directly to moving parts of the tool. This does not necessarily obviate the above mentioned disadvantage, however, since the oil may still reach the moving parts in large droplet form. So-called in-line lubricators are known but various disadvantages attend the use of these devices. For example, lubricant is deposited within lines leading to the tools and this may be undesirable as contaiminating the lines for other uses. Thus, hose lines supplying a sanding or metal working tool cannot interchangeably be used to power a paint sprayer. If it is endeavored to use a principle of self-pressurization, misoperation can result from a continuing application of air pressure, with the tool throttle closed, resulting in introduction of gobs of lubricant and a working of the lubricant upstream in the lines. Still further, in-line lubricators are not accessible for continuous observation and this is a particular disadvantage in the use of hand held, pneumatic tools operating remotely of the source of compressed air and connected thereto by flexible pressure fluid conducting hose lines. Introduction of controlled, metered amounts of a lubricant at the tool as compared to an introduction in the lines external to the tool has been heretofor unknown.

SUMMARY OF THE INVENTION

The instant invention provides a pressure responsive tool mounted lubricator and further installs the lubricator at a location beyond the tool throttle or on-off valve so that it is relieved of operating influences when the supply of pressure fluid is cut off at the tool. The lubricator is a unitary device simply and conveniently mounted on the tool, as by being screwed into a provided or existing access opening. It includes a storage tank to hold a supply of lubricant. A lubricant outlet end is received in the tool to communicate with a pressure fluid conducting passage way. Wick means, in the form of a porous plug, is installed in the outlet end. Between the porous plug and the lubricant storage tank is an intermediate ready chamber which is periodically filled from the storage tank and which is pressurized from the tool passageway by virtue of its communication therewith through the porous plug. In one illustrated embodiment of the invention, filling of the ready chamber is under control of a manually adjustable valve which also, when closed, denies access of pressure fluid from the ready chamber to the storage tank. In another illustrated embodiment of the invention these functions are under control of a free floating pressure responsive valve in the ready chamber.

An object of the invention is to introduce lubricant into an actuating pressure fluid supplied to a pneumatic tool or the like by means precluding access of the lubricant to fluid supply lines in advance of the tool.

Another object of the invention is to provide a lubricator device unitarily applicable to a pneumatic tool or the like to operate in conjunction with or responsively to operation of a throttle valve.

A further object of the invention is to provide a lubricator device readily applicable to existing tools.

Still another object of the invention is to provide a lubricator device incorporating a lubricant storage tank and a selectively pressurized ready chamber intermittently supplied with lubricant from the tank, and including means to inhibit pressurization of the tank.

A still further object of the invention is to provide a tool mounted lubricator device utilizing air or like pressure within the tool to meter lubricant back into the tool to be carried to operating parts thereof.

Still another object of the invention is to utilize in a lubricator device a porous plug means useful in the carrying of lubricant to operating parts in a finely dispersed mist form.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawings wherein are shown some but obviously not necessarily the only forms of embodiment of the invention.

FIG. 1 is a view in longitudinal section, and partly diagrammatic, showing a pneumatic tool with a lubricator device in accordance with a first illustrated embodiment of the invention applied thereto;

FIG. 2 is a view in vertical section of a lubricator device as shown in FIG. 1;

FIG. 3 is a detail view of a control disc comprised in the FIG. 2 embodiment;

FIG. 4 is a view similar to FIG. 2, showing a lubricator device in accordance with another illustrated embodiment of the invention, the parts being shown substantially as they appear in a non-pressurized condition or with the flow of compressed air cut off at the tool; and FIG. 5 is a view like FIG. 4, showing the parts in a position they assume immediately upon admission of pressure fluid to the tool.

Like parts are indicated by similar characters of reference throughout the several views.

A lubricator device in accordance with the present invention has wide application to pneumatic tools and is generally applicable to tools or machines having movable parts driven by compressed air or like actuating pressure fluid. The invention is in the present instance shown as embodied in a sanding tool of the straight line type as used in automobile body refinishing operations. The tool is portable and held in the hands when in use and is connected by flexible pressure fluid conducting hose lines to a source of compressed air.

As shown in FIG. 1, the tool includes an elongated body 10 having its configuration completed at what may be regarded as rear and front ends by respective head members 11 and 12. A handle 13 mounts to the body assembly toward the rear thereof, and, in conjunction with a forwardly mounted knob 14 constitutes a means to hold and to guide the tool in use. In the body 10 are opposing piston chambers 15 and 16, outer ends of which are closed by the respective head members 11 and 12. At their inner ends, chambers 15 and 16 communicate through respective passages 17 and 18 with a vertically orienting bore 19 extending completely through the body 10 from top to bottom thereof.

Within piston chamber 15 is a reciprocable piston means 21 integrated with which is a segmental rack portion 22. The latter meshes with a pinion 23 rotatably mounted on a transverse pivot stud 24. Pinion 23 is accommodated in a lower body opening 25 and projects therethrough to a plane beneath the body. A corresponding, relatively reversely oriented piston means 26 is in chamber 16, and, through a rack portion 27 is in rotary driving relation to a pinion 28. The latter mounts on a stud 29 in a body opening 31 in the same manner as pinion 23 is accommodated.

A flat, elongated plate 32 underlies the body 10 and has a sliding mount in a pair of guide members 33 (one shown) fastened to and dependent from the sides of body 10. At the location of pinions 23 and 28, the plate 32 has rack segments 34 and 35 respectively meshing with associated pinions. Intermediate the rack segments 34 and 35, the plate 32 mounts a segmental rack portion 36 orienting in a sense angularly of the rack portions 34 and 35 and meshing with a pinion 37. Integrated with pinion 37 is a sleeve 38 projecting upward into body bore 19 where it has a rotary bearing in a bushing 39. In the bushing 39 are ports 41 and 42 aligned respectively with body openings 17 and 18. At an inner or what may be regarded as an upper end thereof, bushing 39 terminates substantially midway in the bore 19. In spaced relation to the bushing 39, and received in a substantially closing relation to the upper end of bore 19, is another insert means or short length bushing 43. The bushings 39 and 43 cooperate in defining an interior bore chamber 44. A rotary valve device 45 has a head portion received in chamber 44 and a shank portion rotatably mounted in bushing 39 to extend in a controlling relation to ports 41 and 42 and coupled to sleeve 38.

Chamber 44 is part of a fluid pressure passageway including a longitudinal body passage 46, an entrance end portion 47 of which is formed in rear head member 11. A fitting 48, to which a free end of a compressed air supply hose or the like is adapted to be connected, mounts to head member 11 to open to the entrance portion 47 of passage 46. Also in the head member 11 is a vertically orienting through bore 49 which intersects passage 47. A lower part of bore 49 is formed as a counterbore and is closed by installed screw plug means 51. Within the counterbore portion, and based on closure means 51, is a compression spring 52 urging a ball valve 53 to a seat in the relatively small diameter portion of bore 49 above passage 47. The arrangement, which is generally only schematically indicated herein, is one in accordance with which ball 53 normally is urged by spring 52 to a position closing the entrance portion 47 of passage 46. Under such condition, the pressure fluid supplied to fitting 48 is cut off from access to body supply passage 46 and thereby from access to chamber 44 and operating parts of the tool. A plunger means 54 received in the upper end of bore 49, above the passage portion 47, projects upwardly therefrom to abut a pivotally mounted trigger member 55 carried by the handle 13. Valve 53 is an on-off or throttle valve which when allowed to close under the influence of spring 52 denies a flow of pressure fluid to passage 46 and operating parts of the tool. Depression of trigger 55, however, thrusts plunger 54 downwardly to unseat the valve 53 and allow pressure fluid to enter the tool and initiate tool operation.

The rotary valve member 45 is movable in an oscillatory sense in the bushing 39, and, in so moving, connects ports 41 and 42 alternately to chamber 44. The construction of the valve by which this is accomplished is not here disclosed in detail, the pneumatic tool incorporating the instant invention being in this respect a well known article of manufacture. Fluid admitted to chamber 15 expands to effect an outward driving movement of piston means 21. This is effective through pinion 23, plate 32 with rack portions 34 and 35 thereon, and through pinion 28 to effect an opposite or retracting movement of piston 26. The admission of pressure fluid to chamber 16, through port 42, has an opposite effect, with piston 26 in this instance being powered outwardly and piston 21 retracted through the described rack and pinion mechanisms. With valve 45 oscillating to connect ports 41 and 42 alternately to the chamber 44 the result is to effect a reciprocating motion of plate 32. The oscillatory movement of valve 45 is the result of its connection through pinion 37 with rack portion 36. Plate 32 is adapted to have mounted thereto abrading means appropriate to the work to be performed.

A continuous sanding or like operation is carried out by the tool as long as trigger 55 remains depressed. Upon release of the trigger, all flow of pressure actuating fluid to the valve 45 ceases and operation of the tool stops.

In a prior art use of the tool, the upper end of valve bore 19 is closed by a removable cap enabling access to the bore for valve servicing. In accordance with the present invention, however, there is installed to close the upper end of bore 19 a lubricator device 56 functioning to introduce lubricant into the tool in such manner that metered quantities of lubricant join inflowing pressure fluid and reach operating parts of the tool in a dispersed, mist form. At its one end, device 56 provides an externally threaded projection 57 by which the device is screwed into an internally threaded bore 58 in the bushing 43. The device 56 accordingly positions in a sense forwardly of the handle 13, over pressure fluid chamber 44 and in an upright position in accordance with which it is readily accessible, and, if so constructed, with its contents visible.

In the embodiment of the invention shown in FIGS. 1 and 2, the device 56 comprises a body 59 having a central through bore 61. Externally threaded projection 57 extends as a tip from one end of body 59 and provides a counterbore 62 recessed into the body 59. That end of body 59 opposite projection 57 is formed with a relatively broader counterbore 63, forming a chamber 69 defined by a wall which is internally threaded at what may be regarded as its open outer end. An externally threaded cap 64 received in the open outer end of counterbore 63 acts as a closure for the chamber 69.

A screw 65 has a threaded mounting in the cap 64 and projects to its opposite ends interiorly and exteriorly of the lubricating device 56. The one end of screw 65 which projects interiorly of chamber 69 mounts a valve 66. The outer end of screw 65 mounts a knurled knob 67 by means of which the screw 65 may be selectively rotated to cause the valve 66 thereon to either approach or be retracted from a seat at the bottom of counterbore 63. Between counterbores 62 and 63 bore 61 forms what may be regarded as an interior chamber 68. It will be seen from the drawings that a seating of valve 66 acts to block the bore 61 at a location to one end of chamber 68 to prevent flow thereby while a retraction of the valve will permit a flow between the chambers 69 and 68. As so constructed, the body 59 of the device 56 provides storage tank area 69 adapted to be filled and refilled with a flowable lubricant, for example a lubricating oil, upon removal of cap 64. With valve 66 in an open position lubricant from the storage tank can flow through interior chamber 68 and into the counterbore 62 which contains a wick means 70 as a porous plug made of sintered metal. Further contained in the counterbore 62 is a flat disc 71 which is in superposed relation to and confined in the base end of the counterbore by the plug 70. The disc 71 has a small diameter orifice 72 in its center. It will be noted from the drawings that the lowermost end of plug 70 is exposed at the upper end of chamber 44.

In the operation of the device of FIG. 2, assuming storage chamber 69 to hold a supply of oil, a backing off of screw 65 to lift valve 66 from its seat, as shown in FIG. 1, allows the interior chamber 68 to become filled with oil, such chamber then becoming what may be termed a ready chamber. A reseating of the valve 66 seals the chamber 69 and prevents further flow of its contents to the chamber 68. When the throttle valve 53 of the tool is opened and pressure fluid admitted to pass through the passage 46 to chamber 44, some of the admitted pressure fluid moves upwardly to enter the confines of the lubricating device 56. This pressure fluid will pass through the porous plug 70 and through the aperture in disc 71, tending to lift the central portion of disc 71 from its seat on plug 70. Resultingly, pressure fluid will reach ready chamber 68 where it acts to pressurize the measured quantity of oil held therein. Under the effect of the fluid pressure so applied and the operation of the tool, oil in chamber 68 is gradually metered through the aperture in disc 71 and into the porous plug 70. The oil will move through and fill the plug until, finally, it begins to emerge on the lower surface 73 of the plug in small droplet form. The flowing pressure fluid reaching chamber 44 sweeps the emerging droplets off of surface 73 and in its relatively turbulent flow to and through valve 45 causes the droplets to be finely dispersed so that they pass through the valve and reach other operating parts of the tool in a fine mist form.

The theoretical reasons for so controlled flow are not fully understood but use of the invention clearly confirms the stated results. In this respect, the operation of the tool is normally conducted in a series of "bursts". Also, the level of pressure of compressed air supplied to the tool is not always precisely uniform since the air will normally come from a central source of supply having varied demands made thereon. All such pressure fluctuations, as well, of course, as cutoffs, in pressure imposed by throttle valve 53, are reflected in chamber 44. Accordingly, ample opportunity exists for producing pressure differences which are developed across the opposite ends of the porous plug 70 to induce a movement of oil from ready chamber 68 to surface 73. The valve 66 may not only be used to seal chamber 69 but also be adjusted to provide a controlled flow of lubricant from storage area 69 to ready chamber 68, if such is desired. It accordingly can also be used to provide that compressed air, or other pressure fluid utilized, is blocked from chamber 69 or permitted to reach the same in limited amount, if necessary. Any pressure fluid reaching chamber 69 will tend gradually to escape therefrom along the threads of adjustment screw 65. If it is necessary to use a considerably less porous plug than here contemplated in the preferred embodiments of the invention, the movement of the oil through the plug 70 could be assisted by a presurizing of the chamber 69, but is not preferred.

The lubricator device accordingly operates in correspondence with the operation of the tool and utilizes air pressure from within the tool to meter oil back into the tool as a consequence of and incident to tool operation. The device is effectively shut off when the supply of pressure fluid to the tool is cut off at valve 53. This precludes any possibility of a condition enabling lubricant to work its way upstream of the tool and into the lines which connect the tool with a source of fluid under pressure. If desired, the body 59 may be made in part or in its entirety of a transparent material so that the quantity of lubricant in the storage tank area 69 may be continuously observed. Valve 66 will be periodically lifted for a refill of the ready chamber 68.

The lubricating device of the invention embodiment shown in FIGS. 4 and 5 of the drawings is mounted in the same manner as the device 56 of FIG. 2, and operates to the same end and purpose. This device includes an adapter 74 which at its bottom end has a threaded tip 75 corresponding to the threaded tip 57 of the FIG. 2 embodiment. To its opposite end, the adapter 74 has a bowl-like wall formation 76 which is internally threaded at its uppermost extremity. The formation 76 mounts an inverted cup-like member 77 the lip about the open end of which is externally threaded and screwed into a threaded nested engagement with the bowl-like end of adapter 74. At the upper or closed end thereof, the member 77 has a threaded bore in which is mounted a screw 78. The member 77 defines, in conjunction with bowl-like formation 76, a storage chamber 79 receiving lubricant such as a lubricating oil. A cylindrical recess or counterbore 81 formed in the tip 75 communicates with chamber 79 through a body opening or reduced diameter bore 82 in the base of the bowl-like formation 76. Press fit in the counterbore 81 at its lower or outer end, is a porous plug 83. The latter corresponds in character to the porous plug 70 of the FIG. 2 embodiment of the invention but it is relatively shorter in length so as to provide between its inner or upper end and the bottom of counterbore 81 a spacing defining a chamber 84, the latter corresponding generally to chamber 68 of the first described invention embodiment and constituting a ready chamber. Mounted for free floating adjustment in chamber 84 is a valving disc 85. The disc 85 is imperforate, non-porous and preferably of a thin lightweight plastic. When in a position seating to the bottom of counterbore 81, thereabove, as seen in FIG. 5 of the drawings, valve 85 blocks opening 82 and denies both flow of oil from chamber 79 to ready chamber 84 and entrance of pressure fluid to chamber 79. In any other position the dimension of disc 85 permits fluid to pass its periphery.

As in the first instance the lower or projected end 86 of plug 83 will be exposed at the tip 75.

In use of the embodiment of FIGS. 4 and 5, in a device as shown in FIG. 1 when pressure fluid is cut off by a seating of the valve 53, the valve 85 assumes a position substantially as indicated in FIG. 4. Thus, at this time, oil or lubricant from storage chamber 79 is free to enter and fill ready chamber 84, and, although the porous plug 83 will be wet no appreciable flow of oil to an under surface 86 thereof occurs. When valve 53 is opened, however, pressure fluid entering tool chamber 44 has access through the porous plug 83 to ready chamber 84. There it is effective immediately to move valve 85 to a seat in the bottom of counterbore 81 thereabove and is further effective to apply pressure in chamber 84. Under such conditions the lubricator device appears substantially as indicated in FIG. 5, wherein valve 85 is shown in a position to deny passage of pressure fluid to storage chamber 79 and to similarly deny flow of oil from the storage chamber 79 to chamber 84. Continuing tool operation, as discussed in connection with the embodiment first described, finds lubricant in chamber 84 being compelled, under pressure, to move through porous plug 83 to emerge on surface 86 in small droplet form and from there to be swept into the pressure fluid current and conducted to operating parts of the tool. Depending on the porosity of plug 83, the valve 85 will remain in a seated or closed position for varying periods of time following closing of the throttle valve 53. In any event, when chamber 84 becomes unpressurized, and plug 83 becomes relatively dry, valve 85 drops from its seat in the bottom of counterbore 81 and the lubricator device is restored to a position substantially as shown in FIG. 4.

Inverted body member 77 may be made of a transparent plastic or the like for continuous viewing of the stored lubricant. The threaded bore in the upper part thereof may be used as fill opening. Compressed air or other pressure fluid which may reach chamber 79 is allowed to escape therefrom along the threads of screw 78. Porous plug 83 is preferably sintered bronze material, with its porosity being selected, as indicated, to control oil flow as desired and in accordance with pressures to be encountered. Also a factor in the selection of the porous plug is the presence or absence of a control valve between the plug and the storage tank area, as has been indicated in connection with the FIG. 2 embodiment.

From the foregoing, it will be seen that the present invention provides a unique lubricator device which will function to discharge lubricant in a finely dispersed mist only as and when demand is placed thereon by pressure fluid in a related operating tool. The operating results are such that there are several benefits. First, the invention completely obviates the incidence of contamination of air delivery lines by the lubricating oil. Further, the use of a "wick" in conjunction with a ready chamber as provided by the invention enables a most efficient and effective metering of the lubricating oil so as to disperse it in mist form through a related tool. These and other structural and functional advantages of the invention are self-evident and have lent substantial improvements in the related art as well as economies in the operation of fluid pressure operated tools.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to sturctural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privelege is claimed are defined as follows:

1. A lubricating device for a fluid pressure operated pneumatic tool comprising a tool mounted upstanding hollow body having a lower open end bore for communicating with the interior of the tool, the upper end of the bore providing a transverse valve seat and relatively reduced aperture means therein communicating with the upper portion of the hollow body, a wick installed as a plug in the lower open end of the bore with its top spaced below said valve seat, a valving means of less diameter than the inside diameter of said lower end bore and of greater diameter than the reduced aperture means loosely positioned between the top of the wick and said valve seat, and closure means on the top of the hollow body whereby liquid lubricant can be admitted so as to be stored in the hollow body and flow through the reduced aperture means around the valving means and soak the wick when the tool is not pressurized and upon operable pressurization of the tool the pressurized fluid therein passing up through the wick will seat the valving means against the valve seat closing the reduced aperture means and preventing liquid lubricant passing downwardly through said reduced aperture means and again wetting said wick until the operable pressurization of the tool has been discontinued and the valving means sinks by gravity away from said reduced apertured means.

2. A lubricating device according to claim 1, wherein said upper end of the open end bore terminates in a horizontally flat wall providing said valve seat, said aperture means comprising a reduced diameter axially aligned bore in said wall communicating the upper portion of the hollow body with said open end bore.

3. A lubricating device according to claim 2, wherein said valving means is a flat imperforate disc.

* * * * *